United States Patent Office 3,521,731
Patented July 28, 1970

3,521,731
MULTIPLE FRICTION CLUTCHES
Pierre Labat, Suresnes, France, assignor to Societe Anonyme de Vehicules Industriels et d'Equipments Mecaniques Saviem, Suresnes, France
Filed Dec. 9, 1968, Ser. No. 782,354
Claims priority, application France, Jan. 10, 1968, 135,519
Int. Cl. F16d 21/06
U.S. Cl. 192—48.91                                      7 Claims

ABSTRACT OF THE DISCLOSURE

Multiple friction clutch comprising an input shaft and at least two concentric output shafts each provided with a clutch disc and a pair of clamping plates each adapted to engage one face of said disc, said clamping plates being rotatably solid with said input shaft, at least one of said clamping plates being adapted to slide axially along said shaft.

---

This invention relates in general to a multiple clutch of the friction type, comprising at least two output shafts adapted to be selectively connected to the input shaft.

This invention is concerned more particularly with a clutch construction of this general character which, while being relatively simple, permits transferring the input torque or drive from one output shaft to the other output shaft without introducing any gap in the torque transmission.

This invention is also applicable in a simple construction to form an embodiment comprising three output shafts, as will be explained presently.

Basically, the multiple friction clutch according to this invention, which comprises an input shaft and at least two concentrically arranged output shafts each provided with a clutch disc, and a pair of clamping plates rotatably solid with said input shaft and each adapted to engage one face of said clutch disc, at least one of said clamping plates being axially movable on said input shaft, is characterised in that the pair of clamping plates associated with one of said discs are connected respectively to a pair of members axially movable in relation to said input shaft and urged by spring means for clamping engagement with the corresponding disc, and that at least one of said members is responsive to a member controlling its axial movement whereby said other disc is clamped concurrently with the release of said one disc against the force of said spring means.

Various forms of embodiment of clutches constructed according to the teachings of this invention will now be described by way of example with reference to the accompanying drawing, in which.

Figure 1:
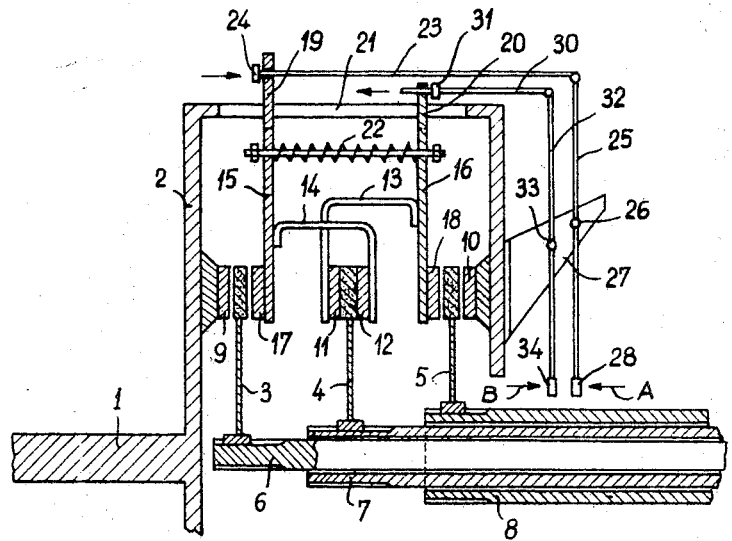
FIG. 1 is a diagrammatic half longitudinal section showing a clutch according to this invention which comprises three output shafts.

The clutch construction illustrated diagrammatically in FIG. 1 comprises a input or power shaft 1 rigid with a bell-shaped member 2 in which the plates for clamping the three clutch discs 3, 4, 5, are mounted, these discs being rotatably solid with three concentrical output shafts 6, 7, 8, of the clutch, on which the disc hubs are mounted for axial sliding movement by means of keys or splines.

The aforesaid bell-shaped member 2 carries a fixed clamping plate 9 associated with disc 3 and another fixed clamping plate 10 associated with disc 5. The clamping plates 11 and 12 associated with disc 4 are connected through braced and mutually angularly off-set arms 13, 14 to members 15, 16 respectively which also act as means for supporting the clamping plates 17, 18 of discs 3, 5. These members 15, 16 are rotatably solid with the bell-shaped member 2 and axially movable therein under the control of dogs 19, 20 slidably engaging corresponding notches 21 formed in the outer periphery of said bell-shaped member 2, each member 15, 16 comprising for example two or three dogs 19, 20.

Between these members 15, 16, are sets of coil compression springs 22 disposed at spaced angular intervals and adapted to urge said plates 11, 12 to their position of clamping engagement with clutch disc 4, the spring guide rod illustrated being adapted to slide through said members 15, 16.

Moreover, means are provided for controlling the axial movements of said members 15, 16 in order to produce the selective engagement of discs 3, 4 and 5. To this end each member 15, 16 is responsive to a unidirectional control force so that it can be moved toward the other member. Thus, as shown diagrammatically in FIG. 1 a control rod 23 formed with a dog driving stop 24 extends freely through each dog 19 externally of the bell-shaped member 2. In this example the control rod 23 is pivotally connected at the outer end of said bell-shaped member 2 to a radial rod 25 fulcrumed intermediate its ends to a pivot pin 26 carried by a bracket 27 secured to said bell-shaped member 2.

The end of radial rod 25 which is adjacent to the output shafts carries a driven thrust member 28 adapted to be moved in the direction indicated by the arrow A and thus cause an axial movement of the corresponding member 15, for example via a conventional clutch driving thrust member (not shown) co-acting with the driven thrust members 28 of the set of radial rods 25.

A control rod 30 also extends freely through each dog 20, each control rod 30 being provided with a dog driving stop 31 and pivotally connected to a radial rod 32 fulcrumed intermediate its ends to a pivot pin 33 carried by the same bracket 27.

At its free end adjacent the output shafts each radial rod 32 carries a driven thrust member 34 adapted to be actuated in the direction of the arrow B to cause the axial movement of member 16, for example by means of a conventional clutch driving thrust member (not shown).

The clutch construction described hereinabove operates as follows:

When no external force is exerted on the driven thrust members 28 and 34, the force of springs 22 clamps the clutch disc 4 by means of plates 11 and 12, thus engaging the input shaft 1 with output shaft 7.

If a thrust is exerted on the drive thrust members 34 in the direction of the arrow B, the assembly comprising the two members 15 and 16 as well as the clamping plates carried thereby is moved bodily to the left as seen in the drawing, the clutch disc 4 sliding on shaft 7 and remaining clamped between plates 11 and 12 until the clamping plate 17 presses the clutch disc 3 against the plate 9. Then continuing the control thrust application will cause the disc 3 to be clamped with a gradually increasing pressure by the clutch springs 22 interposed between the driven member 15 and the aforesaid member 16, while concurrently causing the clamping of disc 4 between plates 11 and 12 to be gradually released, the sum of the forces exerted on discs 3 and 4 respectively remaining constantly equal to the total force exerted by springs 22. When these springs are subsequently compressed as a consequence of the continued control thrust, the clamping plate 11 are moved away from clamping plate 12, thus releasing the disc 4 and therefore the output shaft 7, so that only disc 3 and shaft 6 are engaged.

From the foregoing, it is clear that the stress distribution among the clutch discs during a change from one output shaft to another is obtained automatically in response to the control effort on the device. Moreover, this change takes place without discontinuing the transmission of the engine or input torque through the clutch.

When the control thrust exerted on the driven thrust members 34 in the direction of the arrow B is released, the clutch resumes its initial condition, its component elements performing to the same but reverse sequence of movements, thus causing the gradual release of disc 3 and a coresponding gradual clamping of disc 4.

In this construction the engagement of disc 5 and therefore of output shaft 8 is obtained by exerting on the driven thrust members 28 a thrust in the direction of the arrow A, the change from shaft 7 to shaft 8 as the driven output shaft taking place under the same conditions as those set forth hereinabove in the case of a change from shaft 7 to shaft 6 as the driven output shaft.

Moreover, a general disengagement of the drive is obtained by concurrently exerting a thrust in the direction of the arrow B on the driven thrust members 34 and a thrust in the direction of the arrow A on the driven thrust members 28, whereby the compression of springs 22 will cause the clamping plates 11 and 12 to move away from clutch disc 4.

Of course, the unbroken or unceasing transmission of the engine torque during changes in the driven condition of the output shafts can be obtained under the conditions set forth hereinabove only to the extent that these changes are contemplated as involving a compulsory passage through the intermediate shaft 7, this being subordinate to, governing, the specific design of the transmission with which the clutch is to be associated.

Figure 2:
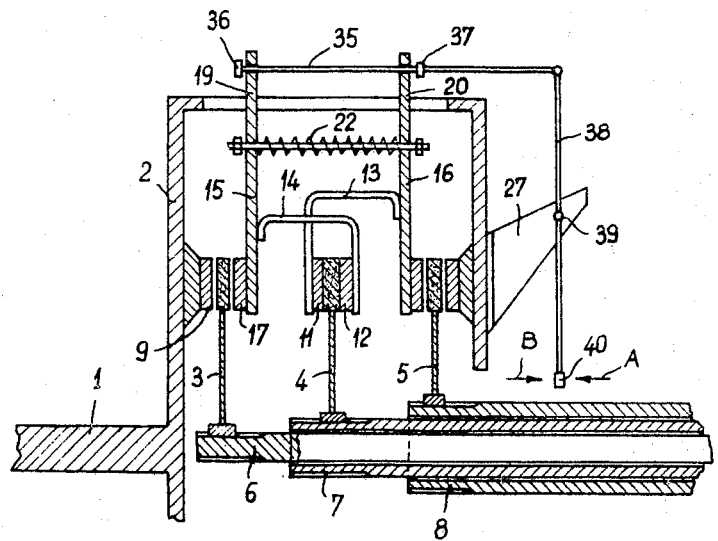
FIGS. 2 and 3 are views similar to FIG. 1 but showing two modified forms of embodiment.

In case it is not required to obtain a complete disengagement of the clutch and the intermediate shaft 7 can normally be left in its engaged or driven condition, the clutch control means may be simplified as illustrated in FIG. 2 wherein the clutch component elements corresponding to those of FIG. 1 are designated by the same reference numerals.

In this case, a single control rod 35 extends freely through the dogs 19 and 20 of members 15, 16 and carries a pair of stops for unidirectionally driving the members 15 and 16 towards each other, one stop 36 controlling dog 19 and another stop 37 controlling dog 20. In their position corresponding to the clamping of disc 4 by plates 11, 12 under the control of springs 22 (which is the inoperative clutch position), these stops 36, 37 are disposed freely on either side of the pair of relevant dogs. The axial control rod 35 is pivotally connected to a radial rod 38 fulcrumed intermediate its ends to a pivot pin 39 carried by the bracket 27. This radial rod 38 carries at its free end, adjacent the output shafts, a driven thrust member 40 adapted to be actuated by exerting thereon a thrust in the direction of the arrows A or B for causing the axial movement of one of said members 15 or 16, for example by means of a double thrust member (not shown).

The actuation of this control system in direction A or B involves the same operational sequence as that explained hereinabove with reference to FIG. 1.

Figure 3:
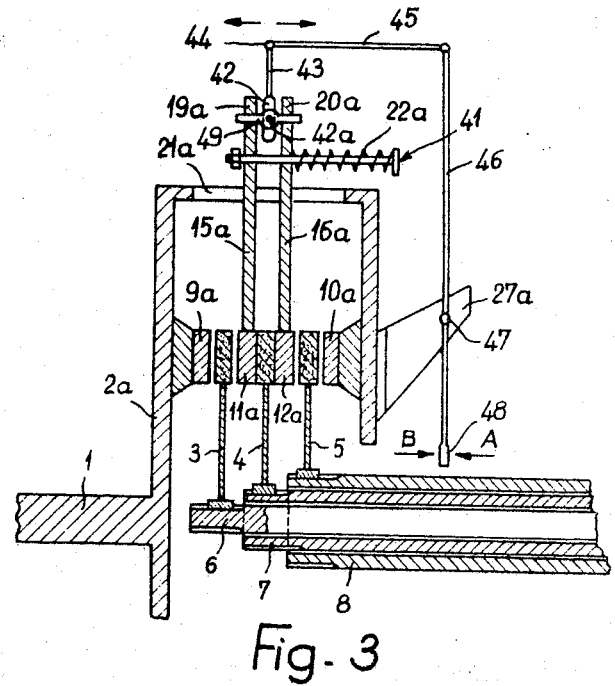

With the same reserve, i.e. that the intermediate shaft is maintained in its engaged condition in the inoperative clutch condition, FIG. 3 illustrates a modified form of embodiment wherein the number of movable clamping plates is halved and therefore reduced to only two.

This arrangement comprises likewise the concentric output shaft 6, 7, and 8 carrying the clutch discs 3, 4 and 5 to which correspond, in addition to a pair of fixed plates 9a, 10a carried by the bell-shaped member rigid with the input or engine shaft 1, a pair of movable intermediate plates 11a, 12a.

These plates are carried by a pair of members 15a, 16a respectively, which are rotatably solid with, but adapted to slide axially in relation to, said bell-shaped member 2, adequate dogs or like driving members 19a, 20a, disposed at spaced angular intervals and slidably engaging notches 21a of said bell-shaped member 2, being provided to this end.

The plates 11a and 12a are normally urged for clamping engagement with the disc 4 by coil compression springs 22a each interposed between the dog 20a and the head of a rod 41 extending freely through said dog and fastened to the other dog 19a, as shown.

This clutch is controlled by means of a cam 42 adapted when actuated to move the plates 11a and 12a away from each other by being interposed between the registering faces of said dogs; this cam is fulcrumed to a pivot pin 42a carried by a member 49 slidably engaging passages formed in said dogs. This cam 42 is solid with a rod 43 pivotally connected at 44 to an axial control rod 45 pivoted in turn to a radial control rod 46 fulcrumed intermediate its ends to a pivot pin 47 carried by a bracket 27a. The free end of radial rod 46 which is adjacent to the output shafts carries a driven thrust member 48 adapted to be actuated in the direction of the arrows A or B, for example by means of a double driving thrust member (not shown).

This clutch operates in the same manner as the clutch illustrated in FIG. 1 as far as the change from output shaft to another is concerned, but its control means operate in the manner described hereinafter:

When no external action is exerted on the driven thrust member 48 the plates 11a and 12a clamp the disc 4 as a consequence of the resilient pressure exerted by springs 22a, whereby the shaft 7 is driven.

If a thrust is exerted on the driven thrust member 48 in the direction of the arrow B, it will cause firstly, as a consequence of the movement of pivot pin 44 to the left as seen in the drawing, an axial movement of the complete assembly comprising cam 42, cam pivot support 49, dogs 19a, 20a and therefore plates 11a, 12a, together with the disc 4 sliding on shaft 7, until the clamping plate 11a presses the disc 3 against plate 9a.

Then continuing the control thrust (arrow B) will produce a gradual clamping of disc 3 as a function of the cam-pivoting reaction exerted by the registering dogs on cam 42, whereby this cam will tend to tilt with its rod 43 about its pivot pin 42a, so as to react against dog 19a and move dog 20a while compressing the springs 22a; consequently, the disc 3 is gradually clamped to the extent in which the other disc 4 is gradually released. When the thrust (arrow B) thus maintained moves the plate 12a away from plate 11a, the shaft 7 is released so that only disc 3, and therefore shaft 6 are engaged.

When the control thrust exerted on the driven thrust member 48 in the direction of the arrow B is released, the clutch mechanism resumes automatically its initial condition through the reverse sequence of movements involving a gradual release of disc 3 and a corresponding gradual clamping of disc 4.

Figure 4:
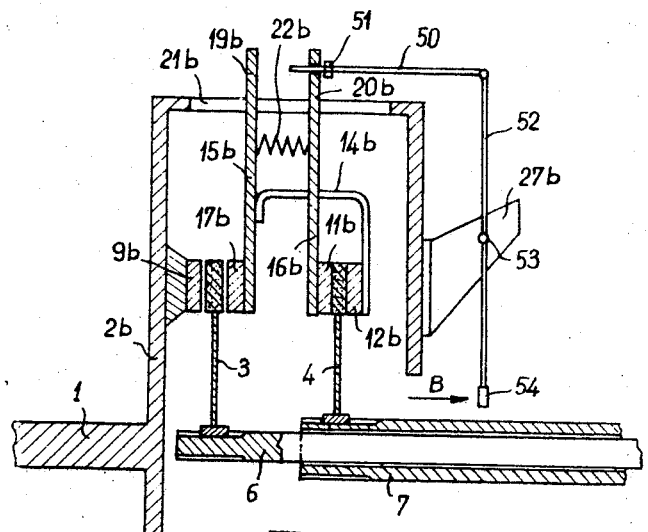
FIG. 4 is a view similar to FIG. 1 but showing another form of embodiment comprising two output shafts.

FIG. 4 illustrates the application of this invention to a clutch construction comprising two concentric output shafts 6 and 7 provided with clutch discs 3 and 4 to which correspond on the one hand a fixed plate 9b carried by the bell-shaped member 2b solid with the input shaft and a movable plate 17b, and on the other hand a pair of movable plates 11b, 12b.

Plate 12b is connected through arms 14b to member 15b supporting plate 17b. The other plate 11b is carried by a member 16b which, together with member 15b, is mounted to be rotatably solid with, and axially movable within, said bell-shaped member 2b, through the medium of dogs 19b, 20b, disposed at spaced angular intervals and slidably engaging notches 21b of said bell-shaped member.

Interposed between members 15b and 16b are coil compression springs 22b disposed at spaced angular intervals and normally clamping the disc 4 between the plates 11b and 12b.

To change from the engaged condition of disc 4 (and therefore of shaft 7) to that of disc 3 (and therefore of shaft 6), control means disposed externally of said bell-shaped member 2b are provided; these control means comprise for each dog 20b a rod 50 extending freely therethrough and provided with a control stop 51; this rod 50 is pivotally connected to a radial rod 52 fulcrumed intermediate its ends to a pivot pin 53 carried by a bracket 27b. This radial rod 52 carries at its free end adjacent said output shafts 6, 7, a driven thrust member 54 adapted to be moved py exerting a thrust thereon in the direction of the arrow B, for example through the medium of a conventional clutch thrust control member (not shown).

When no external action is exerted on the driven thrust member 54, the plates 11b and 12b urged by springs 22b clamp the disc 4, thus causing the output shaft 7 to be driven.

When a thrust is exerted on the driven thrust member 54 in the direction of the arrow B this member 54, due to the co-action of stop 51 and dog 20b, will firstly cause an axial movement of the assembly comprising plates 11b, 12b and disc 4 sliding along shaft 7, until the clamping plate 17b presses disc 3 against plate 9b. Then, continuing the control thrust will cause the disc 3 to be gradually clamped through the medium of springs 22b, and the clamping of disc 4 is concurrently and gradually released, the sum of the efforts exerted on these discs 3 and 4 remaining constantly equal, during the transfer of the clamping action from one disc to the other, to the total stress exerted by springs 22b. When these springs 22b are compressed as a consequence of the continued control thrust, the clamping plate 11b is moved away from the other clamping plate 12b and the disc 4 is released while only the disc 3 and therefore the output shaft 6 are engaged or driven.

When the control thrust thus exerted in the direction of arrow B is released, the clutch mechanism resumes its initial condition through a reverse sequence of movements involving the gradual release of disc 3 and a corresponding gradual clamping of disc 4.

Moreover, this specific form of embodiment may be if desired comprise means for releasing the disc 4; in this case, it will only be necessary to provide means similar to those controlling member 15 of FIG. 1 for controlling member 15b, in order to obtain likewise the release of disc 4 by exerting joint control thrusts in the directions of arrows A and B.

Of course, it would not constitute a departure from the basic principles of the claimed invention to bring various modifications and variations to the specific forms of embodiment shown and described herein, as will readily occur to anbody conversant with the art.

What is claimed is:

1. Multiple friction clutch comprising an input shaft and at least two concentric output shafts each provided with a clutch disc and a pair of clamping plates each adapted to engage one face of said disc, said clamping plates being rotatably solid with said input shaft, at least one of said clamping plates being adapted to slide axially along said shaft, the pair of clamping plates associated with one of said discs connected respectively to a pair of spring biased members axially movable in relation to said input shaft and urged into clamping engagement with the corresponding disc, and at least one of said members responsive to a member controlling its axial movement whereby another disc is clamped concurrently with the release of said one disc against the force of said spring means.

2. Multiple clutch according to claim 1, in which said movable members are so interconnected as to clamp the corresponding disc as they are urged away from each other by said spring bias, at least one of said members carrying in addition to said plate for clamping the corresponding disc and on the disc side opposite to said plate, another plate for clamping the adjacent clutch disc.

3. Multiple clutch according to claim 1, in which said movable members are urged towards each other by said spring bias on either side of said disc and that at least one of said disc clamping plates also acts as a disc for clamping the adjacent clutch disc.

4. Multiple clutch according to claim 2, comprising three discs of which one is adjacent to either said of said corresponding disc, and two interconnected movable members each comprising a pair of clamping plates adapted to co-act the one with said corresponding disc and the other with one of said adjacent discs, said adjacent discs being disposed between a pair of fixed clamping plates.

5. Multiple clutch according to claim 4, in which the two movable members are responsive to control means adapted to produce the separate and unidirectional displacement thereof.

6. Multiple clutch according to claim 4, in which the two movable members are responsive to a common axial displacement control means comprising unidirectional-drive thrust members.

7. Multiple clutch according to claim 6, in which said axial movement control means comprise a member interposed between said movable members so as to cause the movement of translation thereof to a position in which they co-act with the disc adjacent to said disc, and subsequently move said members away from each other as a consequence of a tilting movement resulting from a continued control thrust.

References Cited

UNITED STATES PATENTS

| 2,261,432 | 11/1941 | Cooke | 192—48.8 |
| 2,396,456 | 3/1946 | Campodonico | 192—48.91 XR |
| 2,436,817 | 3/1948 | Miller | 192—48.9 XR |
| 2,613,778 | 10/1952 | Carlson | 192—48.8 |

MARK NEWMAN, Primary Examiner

A. D. HERRMANN, Assistant Examiner

U.S. Cl. X.R.

192—70.3